United States Patent [19]
Underhill

[11] Patent Number: 4,956,968
[45] Date of Patent: Sep. 18, 1990

[54] ROUND BALER WITH MECHANISM FOR DISPENSING WRAPPING MATERIAL

[75] Inventor: Kenneth R. Underhill, Strasburg, Pa.

[73] Assignee: Ford New Holland, Inc., New Holland, Pa.

[21] Appl. No.: 448,404

[22] Filed: Dec. 11, 1989

[51] Int. Cl.⁵ .......................................... A01D 39/00
[52] U.S. Cl. ..................................... 56/341; 53/587; 56/343; 100/88
[58] Field of Search ....................... 56/341, 343; 100/5, 100/15, 87, 88; 53/587

[56] References Cited

U.S. PATENT DOCUMENTS

| | | | |
|---|---|---|---|
| 4,366,665 | 1/1983 | Van Ginhoven et al. | 56/341 |
| 4,597,249 | 7/1986 | Bowden, Jr. | 56/341 X |
| 4,599,844 | 7/1986 | Clostermeyer et al. | 56/343 X |
| 4,604,855 | 8/1986 | Krone et al. | 53/587 X |
| 4,697,402 | 10/1987 | Anstey et al. | 53/587 X |
| 4,729,213 | 3/1988 | Raes | 56/341 |
| 4,790,125 | 12/1988 | Merritt | 53/587 X |
| 4,855,924 | 8/1989 | Strosser et al. | 56/341 X |
| 4,870,812 | 10/1989 | Jennings et al. | 56/341 |
| 4,899,651 | 2/1990 | Lausch et al. | 56/341 |

Primary Examiner—Thuy M. Bui
Attorney, Agent, or Firm—Darrell F. Marquette; Frank A. Seemar; Larry W. Miller

[57] ABSTRACT

An agricultural baler for making cylindrical bales of crop material having a sledge assembly movable between bale starting and full bale positions. The sledge assembly includes a plurality of rollers which cooperate with an apron to define a bale forming chamber. A dispensing mechanism is carried on the sledge assembly for dispensing sheet material, such as net or plastic film, into the bale forming chamber so that it is wrapped circumferentially around a cylindrical bale of crop material disposed in the bale forming chamber. The dispensing mechanism is movable into a dispensing position wherein a tail of the sheet material is inserted through a gap between the apron and one of the rollers of the sledge assembly.

7 Claims, 4 Drawing Sheets

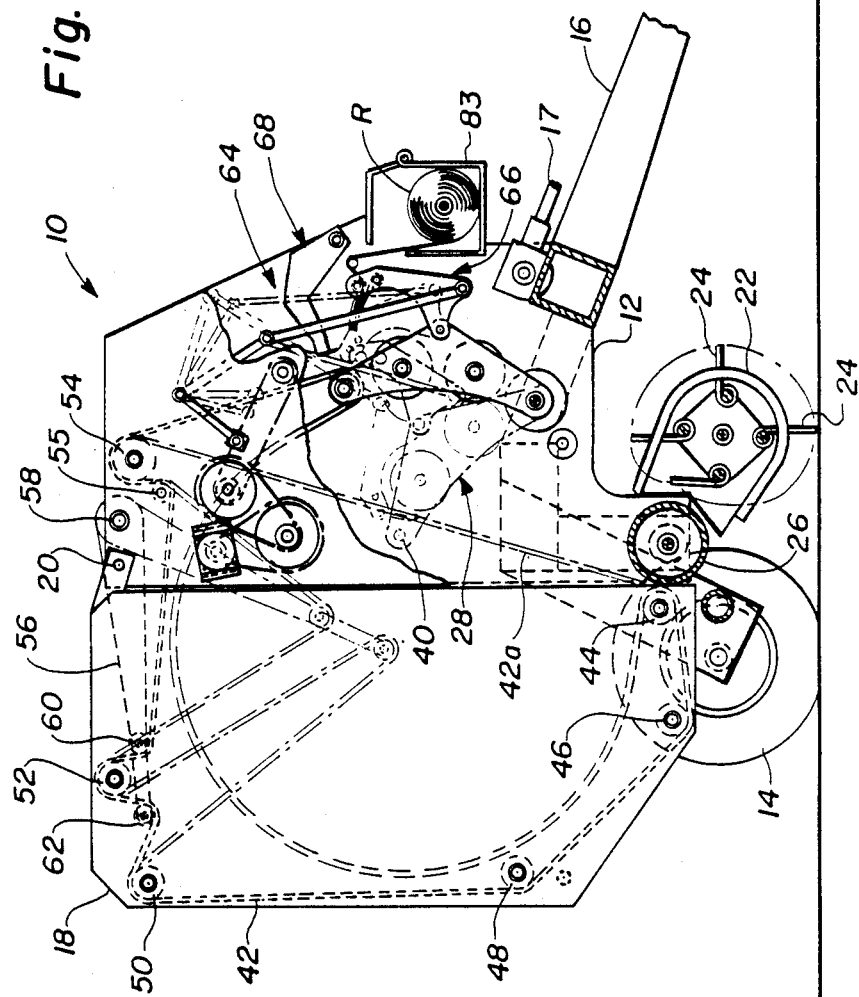

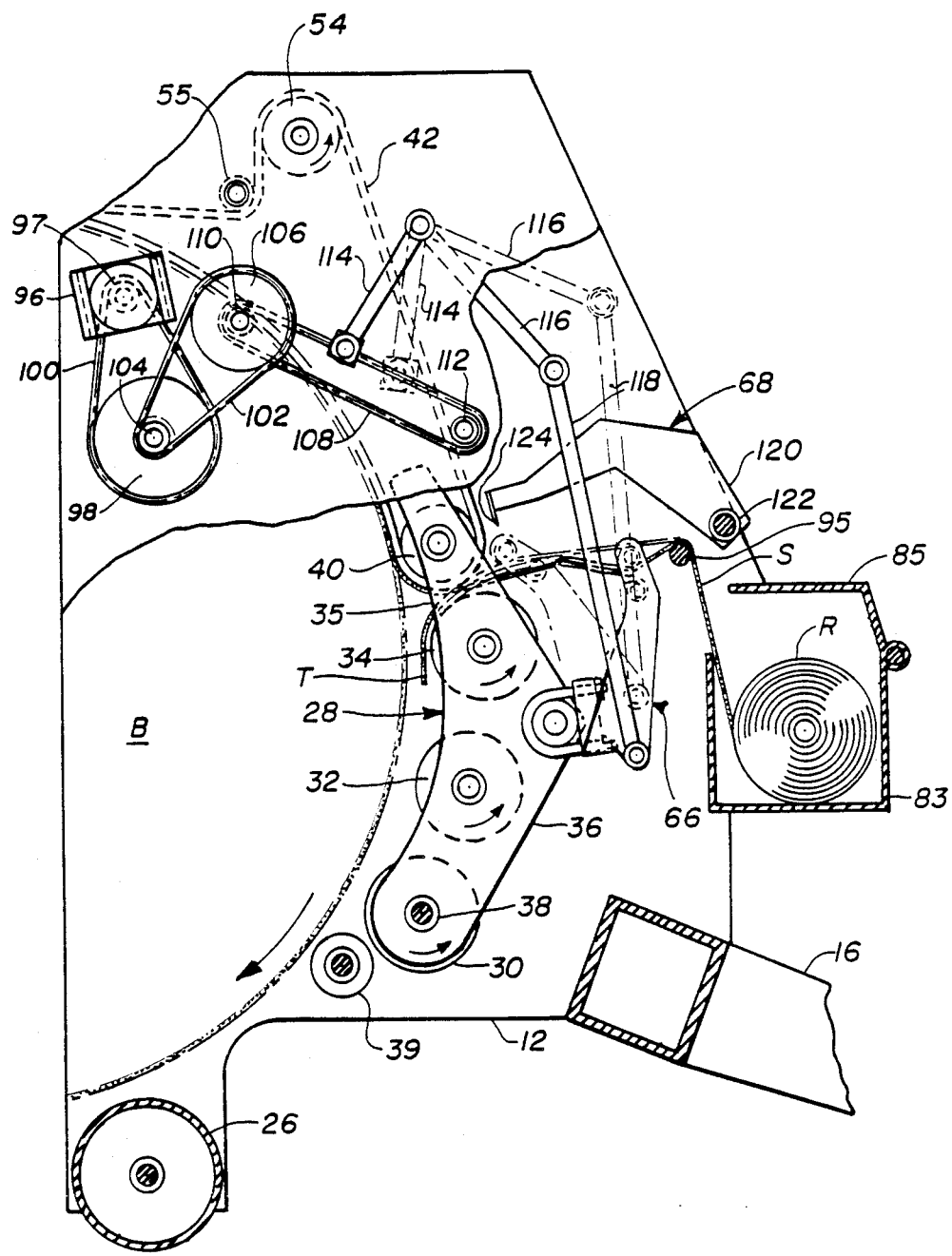

ROUND BALER WITH MECHANISM FOR DISPENSING WRAPPING MATERIAL

BACKGROUND OF THE INVENTION

This invention relates generally to agricultural balers typically referred to as round balers which form cylindrical (i.e. round) bales of crop material.

U.S. Pat. No. 4,870,812 granted Oct. 3, 1989 to R. E. Jennings et al. discloses a round baler wherein a sledge assembly consisting of a plurality of rollers cooperates with an apron consisting of a plurality of belts to define a bale forming chamber. The sledge assembly is movable between bale starting and full bale positions during bale formation. A drawback of the baler disclosed in the Jennings et al patent is that it is difficult to employ conventional wrapping apparatus such as disclosed in U.S. Pat. Nos. 4,366,665 to R. M. Van Ginhoven et al. and 4,790,125 to J. H. Merritt because the throat or inlet for the bale forming chamber is more confined on the baler of the Jennings et al patent. Furthermore, there is less space on the baler of the Jennings et al. patent for mounting the conventional wrapping apparatus of the Van Ginhoven et al. and Merritt patents.

SUMMARY OF THE INVENTION

The present invention provides an agricultural baler of the type for making cylindrical bales of crop material wherein the baler comprises a main frame, a tailgate pivotally connected to the main frame, a sledge assembly mounted on the main frame for movement between a bale starting position and a full bale position, and an apron movably supported on the main frame and the tailgate. The sledge assembly includes a plurality of rollers extending transversely of the main frame, and the apron cooperates with the rollers of the sledge assembly to define a bale forming chamber. The baler also comprises dispensing means carried on the sledge assembly for dispensing sheet material into the bale forming chamber so that it is wrapped circumferentially around a cylindrical bale of crop material disposed in the bale forming chamber.

In the preferred embodiment of the present invention, the dispensing means is pivotally mounted on the sledge assembly for movement between a retracted position and a dispensing position. The dispensing means is operable in the dispensing position for inserting a tail of the sheet material through a gap between the apron and one of the rollers of the sledge assembly so that this tail is caught between the one roller and a cylindrical bale which is rotated in the bale forming chamber by the apron. In this embodiment, the sledge assembly includes idler means engaging the apron for maintaining the apron in close proximity to the one roller during movement of the sledge assembly between the bale starting and full bale positions. The gap for inserting the sheet material into the bale forming chamber is located between the idler means and the one roller.

DESCRIPTION OF THE DRAWINGS

FIG. 1 is a side elevational view of a round baler according to the embodiment of the present invention;

FIG. 2 is an enlarged side elevational view illustrating the operation baler of FIG. 1 when wrapping a bale;

DESCRIPTION OF THE PREFERRED EMBODIMENT

Figure 4:
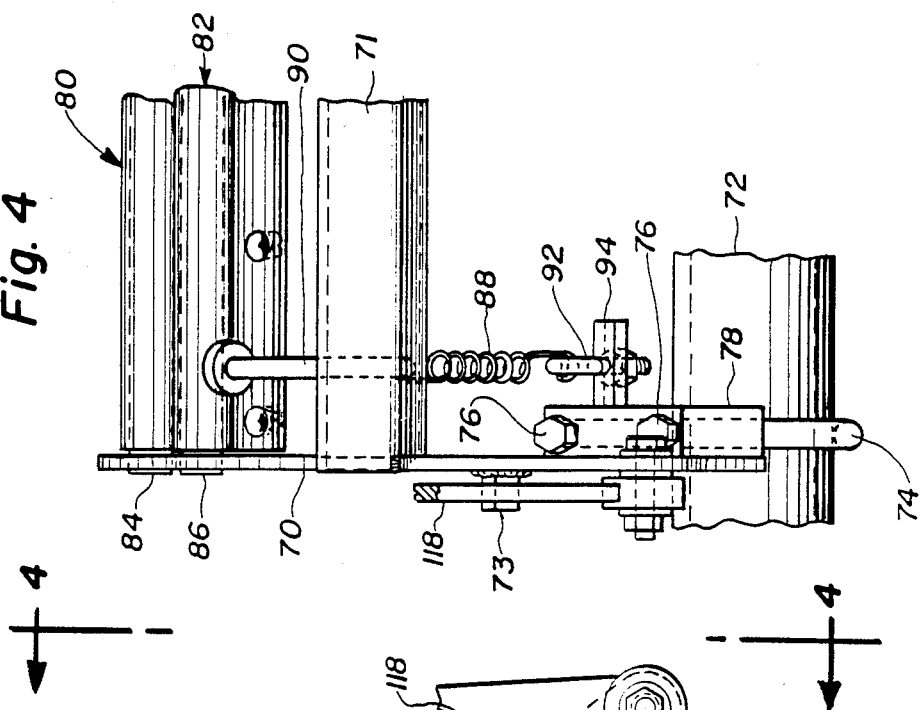
FIG. 4 is a view taken in the direction of arrows 4—4 in FIG. 3.

Referring to FIG. 1, a round baler 10 according to the present invention includes a main frame 12 supported by a pair of wheels 14. A tongue 16 is provided on the forward portion of the main frame 12 for connection to a tractor (not shown). A tailgate 18 is pivotally connected to the main frame 12 by stub shafts 20 so that the tailgate 18 may be closed as shown in FIG. 1 during bale formation or opened to discharge a completed bale. A conventional pickup 22 is mounted on the main frame 12 and is supported by a pair of wheels (not shown). The pickup 22 includes a plurality of fingers or tines 24 movable in a predetermined path to lift crop material from the ground and deliver it rearwardly toward a floor roll 26 which is rotatably mounted on the main frame 12.

A sledge assembly 28 includes a plurality of rollers 30, 32, 34 extending transversely of the main frame 12 in an arcuate arrangement best seen in FIG. 2. The rollers 30, 32, 34 are journalled at the ends thereof in a pair of spaced apart arms 36. These arms 36 are pivotally mounted inside the main frame 12 on stub shafts 38 for permitting movement of the sledge assembly 28 between a bale starting position shown in broken lines in FIG. 1 and a full bale position shown in solid lines in FIG. 1. The rollers 30, 32, 34 are driven in a counter-clockwise direction as viewed in FIGS. 1 and 2 by conventional means (for example, chains and sprockets or gears) connected with a drive shaft 17 which is adapted for connection to the power take off of a tractor (not shown). A stripper roll 39 is located adjacent roller 30 and is driven in a clockwise direction, as viewed in FIG. 2, to strip crop material from the roller 30. An idler roller 40 is carried by the arms 36 for movement in an arcuate path when the sledge assembly 29 moves between its bale starting and full bale positions. The idler roller 40 is freely rotatable.

An apron 42 includes a plurality of flat belts arranged side-by-side and supported on guide rolls 44, 46, 48, 50, 52 which are rotatably mounted in the tailgate 18. The apron 42 is also supported on a drive roll 54 which is rotatably mounted in the main frame 12. Although the apron 42 passes between the roller 34 and the idler roller 40, it is in engagement with only the idler roller 40 but the roller 34 is located in close proximity to the apron belts to strip crop material from the apron 42. Further conventional means (not shown) are connected with the drive shaft 17 to provide rotation of the drive roll 54 in a direction which causes movement of the apron 42 along the path indicated in broken lines in FIG. 1. An additional guide roll 55 in the main frame 12 ensures proper driving engagement between the apron 42 and the drive roll 54. A pair of take up arms 56 are pivotally mounted on the main frame 12 by a cross shaft 58 for movement between inner and outer positions shown in FIG. 1. Take up arms 56 carry additional guide rolls 60 and 62 for supporting the apron 42. Resilient means (not shown) are provided to normally urge the take up arms 56 toward their inner positions while resisting movement thereof from their inner positions to their outer positions.

When the round baler 10 is in the condition shown in FIG. 1 with the tailgate 18 closed, an inner course 42a of the apron 42 extending between the guide roll 44 and the idler roller 40 cooperates with the rollers 30, 32, 34 of the sledge assembly 28 to define a bale forming chamber. The apron inner course 42a forms a rear wall of the chamber while the rollers 30, 32, 34 form a front wall of the chamber. The floor roll 26 is disposed in the bottom of the chamber between the front and rear walls thereof, and the roller 30 is spaced from the floor roll 26 to form a throat or inlet for the chamber.

As the round baler 10 is towed across a field by a tractor (not shown), the pickup tines 24 lift crop material from the ground and deliver it through the throat formed between the floor roll 26 and the roller 30 into the bale forming chamber of the baler 10. The crop material is carried rearwardly by the floor roll 26 into engagement with the apron inner course 42a which carries it upwardly and forwardly into engagement with the rollers 30, 32, 34. The crop material is coiled in a clockwise direction as viewed in FIG. 1 to start a bale core. Continued feeding of crop material into the bale forming chamber by the pickup tines 24 causes the apron inner course 42a to expand in length around a portion of the circumference of the bale core as the diameter thereof increases. The take up arms 56 rotate from their inner position shown in FIG. 1 toward their outer position to permit such expansion of the apron inner course 42a. When a bale has been formed and then wrapped as described later with sheet material such as net or plastic film, the tailgate 18 is opened by conventional means (for example, hydraulic cylinders) and the bale is ejected. Subsequent closing of the tailgate 18 returns the apron inner course 42a to the location shown in FIG. 1, and the round baler 10 is ready to form another bale.

It will be understood that during formation of a bale, sledge assembly 28 moves from its bale starting position to its full bale position. This movement of the sledge assembly 28 causes the idler roller 40 to move in an arcuate path while maintaining the apron 42 in close proximity to the roller 34, thereby allowing the roller 34 to strip crop material from the apron 42 but preventing the loss of crop material between the roller 34 and the apron 42 during formation of a bale. The sledge assembly 28 is pushed outwardly toward its full bale position during bale formation and is pulled inwardly toward its bale starting position during bale ejection without utilizing any additional mechanisms.

In an alternative embodiment of the round baler 10 which is not shown, apron 42 consists of a pair of chains connected together at spaced intervals by transverse slats, and the idler roller 40 is replaced by a pair of idler sprockets engaged with the chains. Also in this alternative embodiment, the guide rolls 44, 46, 48, 50, 52, 55, 60, 62 would be replaced with guide sprockets for engaging the apron chains, and the drive roll 54 would be replaced by drive sprockets.

Figure 3:
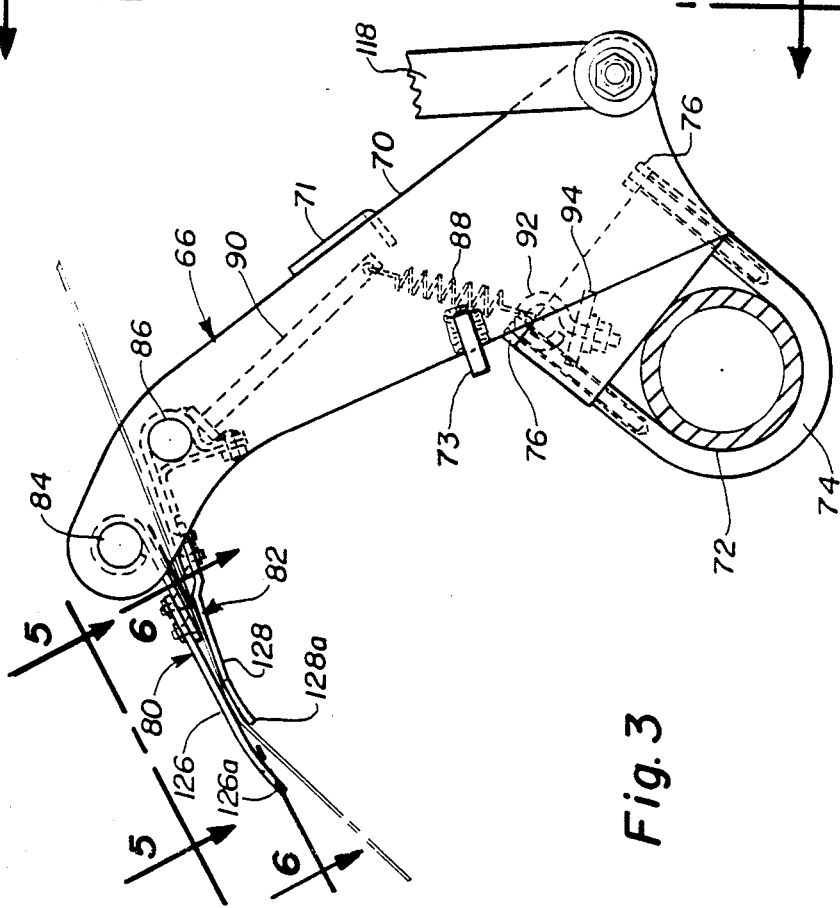
FIG. 3 is an enlarged view of part of the baler of FIG. 1.

According to the present invention, bale wrapping apparatus 64 shown in FIG. 1 includes a dispensing mechanism 66 pivotally mounted on the sledge assembly 28 and a cutting mechanism 68 pivotally mounted on the main frame 12. As best seen in FIGS. 3 and 4, the dispensing mechanism 66 comprises a pair of levers 70 spaced apart but connected by a frame member 71. The levers 70 are rotatably supported on a cross tube 72 that extends between the arms 36 of the sledge assembly 28. Each lever 70 is attached to the cross tube 72 by a clevis 74, and bolts 76 fasten each clevis 74 to brackets 78 fixed to the levers 70. A stop 73 is carried on one of the levers 70 for engagement with one of the arms 36 of the sledge assembly 28 to limit pivoting movement of the dispensing mechanism 66 in a counterclockwise direction as viewed in FIG. 2.

The dispensing mechanism 66 also comprises clamping members 80, 82 extending transversely of the baler 10 between the levers 70 and arranged to dispense sheet material S such as net or plastic film from a supply roll R disposed in a container 83 carried on the baler main frame 12. Container 83 has a lid 85 which may be opened to permit removal of the supply roll R. Clamping members 80 and 82 are mounted respectively on bars 84 and 86 which extend between the levers 70. Springs 88 and links 90 are arranged to urge the clamping member 82 against the clamping member 80. Each spring 88 is connected at one end to one of the links 90 and at the other end to an eye bolt 92 that is fastened to a flange member 94 on one of the brackets 78. The links 90 are engaged with the clamping member 82 in a manner which, due to springs 88, urges the clamping member 82 in a clockwise direction in FIG. 3 about the rod 86. As the sheet material S is dispensed from the supply roll R by the dispensing mechanism 66, it passes over a roller shaft 95 which is mounted in and extends transversely of the baler main frame 12.

Referring to FIG. 2, bale wrapping apparatus 64 also includes a power source such as an electric motor 96 mounted on the main frame 12 with an output shaft 97 thereof connected to a large sprocket 98 by a drive chain 100. Another drive chain 102 connects a small sprocket 104 (which is attached to large sprocket 98) with a sprocket 106. A further drive chain 108 connects a small sprocket 110 (which is attached to sprocket 106) and a small sprocket 112. A first link 114 is pinned at one end to drive chain 108 and pivoted at the other end to a second link 116. A third link 118 is pivotally connected between the second link 116 and one of the levers 70 of the dispensing mechanism 66.

Figure 5:
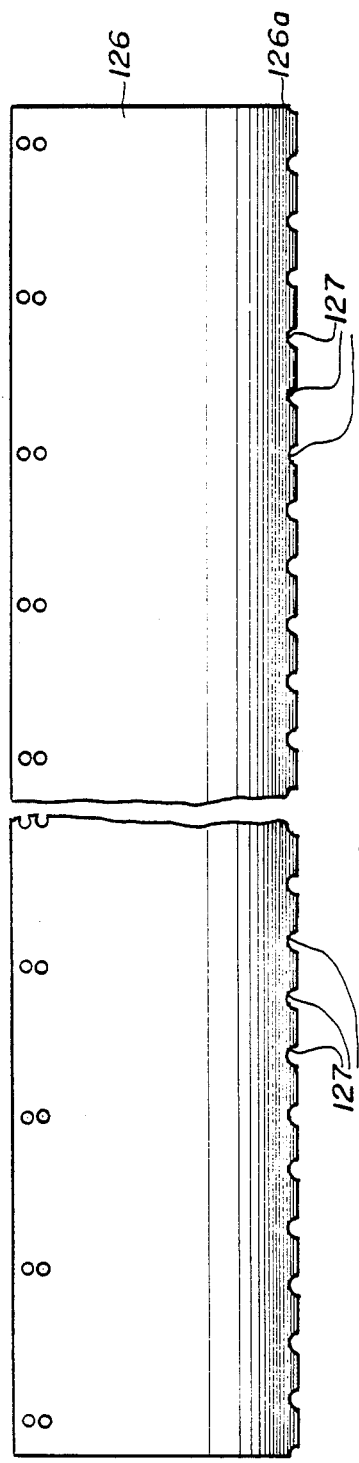
FIG. 5 is a view taken in the direction of arrows 5—5 in FIG. 3.
Figure 6:
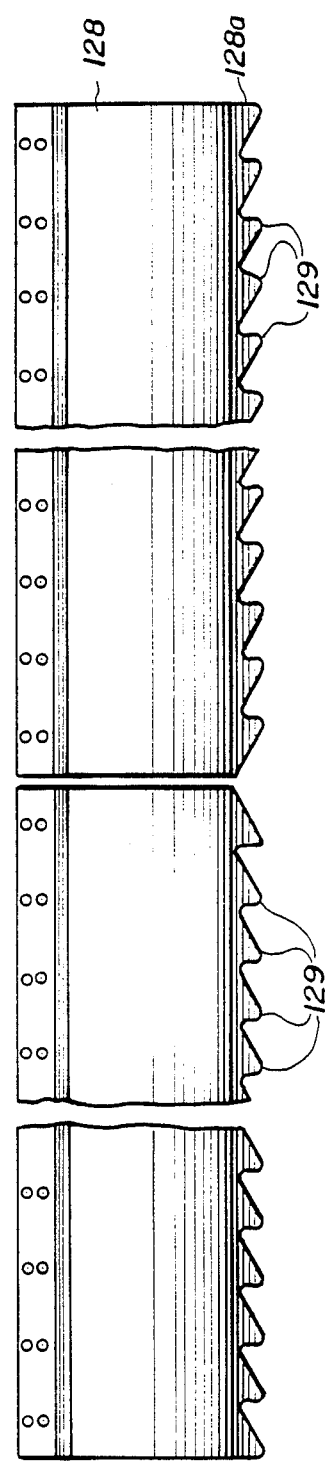
FIG. 6 is a view taken in the direction of arrows 6—6 in FIG. 3.

The cutting mechanism 68 includes a pair of spaced apart arms 120 rotatably supported on a shaft 122. A knife 124 is carried by and extends transversely between the arms 120 for engagement with the sheet material S dispensed by the dispensing mechanism 66. The arms 120 are rotated on the shaft 122 by means (not shown) such as a cam actuated linkage connected between one of the arms 120 and the link 114. The clamping members 80 and 82 of the dispensing mechanism 66 include upper and lower plates 126 and 128, respectively, between which the sheet material S is fed. Upper plate 126 has a leading edge 126a with a plurality of generally semicircular notches 127 formed therein as shown in FIG. 5 while lower plate 128 has a leading edge 128a with a plurality of serrated teeth 129 formed therein as shown in FIG. 6.

When a bale B has been formed in the round baler 10 and it is desired to wrap the bale B with the sheet material S, the electric motor 96 is activated while the apron 42 continues to rotate the bale B in a counterclockwise direction as viewed in FIG. 2. The output shaft 97 of the electric motor 96 drives the sprocket 106 via chains 100, 102. Sprocket 110 drives sprocket 112 via chain 108 which causes movement of the links 114, 116, 118 from the solid line positions of FIG. 2 to the broken line positions of FIG. 2. This rotates the dispensing mechanism 66 from a retracted position shown in solid lines in FIG. 2 to a dispensing position shown in broken lines in FIG. 2. In the retracted position of the dispensing mechanism 66, a tail T of the sheet material S is gripped by the clamping members 80, 82 thereby preventing the sheet material S from being fed into the bale forming chamber of the baler 10. However, in the dispensing position of the dispensing mechanism 66, the tail T of the sheet material S is inserted into the bale forming chamber and sheet material S is dispensed from the supply roll R into the bale forming chamber.

As the dispensing mechanism 66 moves toward its dispensing position, the cutting mechanism 68 is rotated to the position shown in FIG. 2 and the clamping members 80, 82 move into a gap 35 between the roller 34 and the apron 42. The tail T of the sheet material S gripped between the clamping members 80, 82 is inserted through the gap 35 into the bale forming chamber where it is caught between the roller 34 and the bale B which are rotating in opposite directions. The sheet material S is then dispensed from the supply roll R, over the roller shaft 95, between the clamping members 80 and 82, and then through the gap 35 into the bale forming chamber where it is wrapped circumferentially around the bale B while the bale B continues to be rotated by the apron 42.

After the bale B has been wrapped with one or more layers of the sheet material S, the electric motor 96 is reversed thereby moving the dispensing mechanism 66 from the dispensing position shown in broken lines in FIG. 2 to the retracted position shown in solid lines in FIG. 2. The links 114, 116, 118 move back to their solid line positions of FIG. 2. When the dispensing mechanism 66 has returned to its retracted position, the cutting mechanism 68 is rotated counterclockwise as viewed in FIG. 2 so that the knife 124 is brought downwardly into contact with the sheet material S extending from the clamping members 80, 82 of the dispensing mechanism 66. The knife 124 cuts the sheet material S but leaves another tail T which is gripped by the clamping members 80, 82 for future insertion into the bale forming chamber whenever the next bale is ready to be wrapped with the sheet material S.

The details of the upper and lower plates 126 and 128, respectively, are shown in FIGS. 5 and 6. The semicircular notches 127 formed in the leading edge 126a of upper plate 126 prevent the tail T of the sheet material S from being carried out of the gap 35 by the apron 42 when the dispensing mechanism 66 is in the dispensing position. In other words, the notches 127 insure proper dispensing of the sheet material S from the supply roll R into the bale forming chamber of the baler 10. The serrated teeth 129 are provided in the leading edge 128a of lower plate 128 for the purpose of allowing the sheet material S to spread to its nominal width as it is being dispensed from the supply roll R. As seen in FIG. 6, the serrated teeth 129 are slanted outwardly in opposite directions (i.e. left and right) beginning near the center of the lower plate 128. This orientation of the teeth 129 allows the sheet material S to spread transversely across substantially the full width of the bale forming chamber of the baler 10 and keeps the sheet material S spread while it is being wrapped circumferentially around a cylindrical bale disposed in the bale forming chamber. Teeth 129 also prevent the sheet material S from retracting after it has been cut by the knife 124 thereby assuring the formation of the tail T.

What is claimed is:

1. An agricultural baler of the type for making cylindrical bales of crop material, said baler comprising:
   a main frame,
   a tailgate pivotally connected to said main frame;
   a sledge assembly mounted on said main frame for movement between a bale starting position and a full bale position, said sledge assembly including a plurality of rollers extending transversely of said main frame;
   an apron movably supported on said main frame and said tailgate, said apron cooperating with the rollers of said sledge assembly to define a bale forming chamber; and
   dispensing means carried on said sledge assembly for dispensing sheet material into said bale forming chamber so that the sheet material is wrapped circumferentially around a cylindrical bale of crop material disposed in said bale forming chamber.

2. The baler of claim 1, wherein said dispensing means is pivotally mounted on said sledge assembly for movement between a retracted position and a dispensing position.

3. The baler of claim 2, wherein said dispensing means is operable in said dispensing position for inserting a tail of the sheet material through a gap between said apron and one of the rollers of the sledge assembly so that the tail is caught between said one roller and the cylindrical bale which is rotated in the bale forming chamber by said apron.

4. The baler of claim 3, wherein said sledge assembly further comprises idler means engaging said apron for maintaining said apron in close proximity to said one roller during movement of said sledge assembly between said bale starting and full bale positions, and wherein said gap is located between said idler means and said one roller.

5. The baler of claim 1, wherein said apron has an inner course which is expandable in length around a portion of the circumference of the cylindrical bale during formation thereof, and wherein said inner course of said apron cooperates with the rollers of said sledge assembly to define said bale forming chamber.

6. The baler of claim 5, wherein said apron comprises a plurality of flat belts arranged side-by-side, and wherein the rollers of said sledge assembly are disposed in an arcuate arrangement.

7. The baler of claim 5, wherein said inner course of said apron forms a rear wall of said bale forming chamber while the rollers of said sledge assembly form a front wall of said bale forming chamber.

* * * * *